(12) United States Patent
Trombetta et al.

(10) Patent No.: US 11,040,824 B2
(45) Date of Patent: Jun. 22, 2021

(54) CAPSULES AND OTHER CONTAINERS WITH OPTIMIZED RECYCLING ATTRIBUTES AND METHODS FOR MAKING SAME

(71) Applicant: 2266170 Ontario Inc., Mississauga (CA)

(72) Inventors: Liberatore Trombetta, Ancaster (CA); Yucheng Fu, Mississauga (CA)

(73) Assignee: 2266170 Ontario Inc., Mississauga (CA)

( * ) Notice: Subject to any disclaimer, the term of this patent is extended or adjusted under 35 U.S.C. 154(b) by 0 days.

(21) Appl. No.: 17/105,709

(22) Filed: Nov. 27, 2020

(65) Prior Publication Data

US 2021/0078793 A1    Mar. 18, 2021

Related U.S. Application Data

(60) Division of application No. 17/032,206, filed on Sep. 25, 2020, which is a continuation of application No. PCT/CA2019/050504, filed on Apr. 23, 2019.

(Continued)

(51) Int. Cl.
*B65D 85/804* (2006.01)
*B65D 65/40* (2006.01)
(Continued)

(52) U.S. Cl.
CPC .......... *B65D 85/8043* (2013.01); *B32B 27/06* (2013.01); *B32B 27/32* (2013.01);
(Continued)

(58) Field of Classification Search
CPC ... B65D 85/8043; A47J 31/0689; A47J 31/08; A47J 31/407; B65B 29/022; B65B 31/028
(Continued)

(56) References Cited

U.S. PATENT DOCUMENTS 6,959,832 B1   11/2005   Sawada et al.
7,946,217 B2   5/2011    Favre et al.
(Continued)

FOREIGN PATENT DOCUMENTS

AU   2015274023 A1   1/2016
CA      2943295 A1   9/2015
(Continued)

OTHER PUBLICATIONS

"Coffee makers struggle with recyclability of single serve coffee pods", Solid Waste Report 44.10:2, Jade Media Partners, Jun. 18, 2013.

(Continued)

*Primary Examiner* — Dariush Seif
(74) *Attorney, Agent, or Firm* — Manelli Selter PLLC; Edward Stemberger

(57) ABSTRACT

A process is provided for making a beverage capsule for use in a beverage preparing machine. The process includes the steps of: sealing a filter to an interior surface of a body for the beverage capsule to define an ingredients chamber; depositing a desired volume of desired ingredients into the ingredients chamber; and sealing a cover to the body to cover the opening. The cover is sealed to the body to define a hinge zone and a peel zone, wherein the hinge zone has a stronger seal than the peel zone.

20 Claims, 10 Drawing Sheets

Related U.S. Application Data

(60) Provisional application No. 62/661,464, filed on Apr. 23, 2018, provisional application No. 62/661,471, filed on Apr. 23, 2018.

(51) Int. Cl.
*B65B 31/02* (2006.01)
*B65B 61/18* (2006.01)
*B65B 1/02* (2006.01)
*B65B 1/04* (2006.01)
*B32B 27/32* (2006.01)
*B32B 27/06* (2006.01)
*B65B 29/02* (2006.01)

(52) U.S. Cl.
CPC ............... *B65B 1/02* (2013.01); *B65B 1/04* (2013.01); *B65B 29/022* (2017.08); *B65B 31/028* (2013.01); *B65B 61/18* (2013.01); *B65D 65/40* (2013.01); *B32B 2307/7244* (2013.01); *B32B 2439/70* (2013.01)

(58) Field of Classification Search
USPC .......................................................... 53/454
See application file for complete search history.

(56) References Cited

U.S. PATENT DOCUMENTS

| | | | |
|---|---|---|---|
| 8,361,527 B2 | 1/2013 | Winkler et al. | |
| 8,967,038 B2 | 3/2015 | Rivera | |
| 9,232,871 B2* | 1/2016 | Rivera | A47J 31/0689 |
| 9,271,601 B2 | 3/2016 | Kamerbeek et al. | |
| 9,415,913 B1 | 8/2016 | Lanctuit et al. | |
| 9,932,168 B2 | 4/2018 | Hansen | |
| 10,106,285 B2 | 10/2018 | Bolhous et al. | |
| 10,336,498 B2 | 7/2019 | Foster et al. | |
| 10,569,948 B2* | 2/2020 | Sanders | B32B 27/08 |
| 2005/0266122 A1* | 12/2005 | Franceschi | B65D 85/8043 |
| | | | 426/77 |
| 2007/0224319 A1* | 9/2007 | Yoakim | B65D 85/8043 |
| | | | 426/433 |
| 2008/0245236 A1* | 10/2008 | Ternite | A47J 31/407 |
| | | | 99/295 |
| 2008/0314904 A1 | 12/2008 | Perra | |
| 2010/0278454 A1 | 11/2010 | Huffer | |
| 2010/0288133 A1* | 11/2010 | Litzka | B65D 85/8043 |
| | | | 99/299 |
| 2011/0177205 A1 | 7/2011 | Bardazzi et al. | |
| 2011/0259205 A1 | 10/2011 | Delorme | |
| 2011/0259779 A1* | 10/2011 | Moutty | A47J 31/407 |
| | | | 206/524.1 |
| 2012/0015080 A1* | 1/2012 | Roulin | B65D 85/8043 |
| | | | 426/110 |
| 2013/0017303 A1* | 1/2013 | Vu | B65D 85/8043 |
| | | | 426/433 |
| 2013/0115340 A1* | 5/2013 | Doleac | B65D 85/8043 |
| | | | 426/115 |
| 2013/0323371 A1* | 12/2013 | Kutcher | A23L 2/38 |
| | | | 426/231 |
| 2014/0120217 A1* | 5/2014 | O'Brien | B65D 85/8043 |
| | | | 426/115 |
| 2014/0127364 A1* | 5/2014 | Fu | B65D 85/8043 |
| | | | 426/115 |
| 2014/0161936 A1* | 6/2014 | Trombetta | B65D 85/8043 |
| | | | 426/77 |
| 2014/0205721 A1* | 7/2014 | Orsi | B65D 85/8043 |
| | | | 426/115 |
| 2014/0220191 A1 | 8/2014 | Kelly et al. | |
| 2014/0287099 A1* | 9/2014 | Trombetta | B65D 85/8043 |
| | | | 426/87 |
| 2014/0290493 A1* | 10/2014 | Rivera | A47J 31/0663 |
| | | | 99/285 |
| 2014/0345473 A1* | 11/2014 | Albritton | B65D 85/8043 |
| | | | 99/323 |
| 2015/0135967 A1* | 5/2015 | Hoffman | B65D 85/8043 |
| | | | 99/295 |
| 2015/0197394 A1* | 7/2015 | Zanetti | B65D 85/8043 |
| | | | 426/115 |
| 2016/0001903 A1* | 1/2016 | Bartoli | B65B 29/02 |
| | | | 426/112 |
| 2016/0045059 A1* | 2/2016 | Cross | A47J 31/469 |
| | | | 426/435 |
| 2016/0270580 A1 | 9/2016 | Smith | |
| 2017/0055557 A1* | 3/2017 | Roberts | A23L 3/36 |
| 2017/0081112 A1* | 3/2017 | Cabilli | A47J 31/407 |
| 2017/0121050 A1 | 5/2017 | Foster et al. | |
| 2017/0210553 A1* | 7/2017 | Burress | B65B 7/28 |
| 2017/0259989 A1* | 9/2017 | Trombetta | B65B 61/20 |
| 2017/0290460 A1 | 10/2017 | Karles et al. | |
| 2017/0334108 A1 | 11/2017 | Siegl | |
| 2017/0334623 A1 | 11/2017 | Gualandi et al. | |
| 2017/0347825 A1* | 12/2017 | Walter | A47J 31/469 |
| 2018/0272666 A1 | 9/2018 | Wallace | |
| 2018/0319583 A1 | 11/2018 | Schroeder et al. | |
| 2018/0360255 A1* | 12/2018 | Ye | A47J 31/3628 |
| 2019/0367260 A1* | 12/2019 | Robotti | B65D 85/8043 |
| 2020/0047448 A1 | 2/2020 | Foster et al. | |

FOREIGN PATENT DOCUMENTS

| | | |
|---|---|---|
| DE | 4204781 A1 | 8/1993 |
| DE | 4204881 A1 | 8/1993 |
| EP | 0619244 B1 | 11/1995 |
| EP | 2607269 A2 | 6/2013 |
| EP | 3348495 A1 | 7/2018 |
| WO | 2016193961 A2 | 12/2016 |
| WO | 2018075387 A1 | 4/2018 |

OTHER PUBLICATIONS

Caliendo, Heather, "PP Recycling provides new life for Keurig K-Cups: premium coffee maker to shift from multi-layer pods to single-layer polypropylene later this year as demand for recycled PP soars", Plastics Technology 62.7:12 (3), Gardner Publications, Inc., Jul. 2016.
"Recycling the unrecyclable: industry innovations aim to keep traditionally difficult-to-recycle plastics out of the landfill", Plastics Engineering 72.4:S14, Society of Plastics Engineers, Inc. Apr. 2016.
International Search Report in PCT/CA2019/050504 dated Jul. 3, 2019.
International Preliminary Report on Patentability in PCT/CA2019/050504 dated Jul. 10, 2020.
Written Opinion in PCT/CA2019/050504 dated Jun. 26, 2019.

* cited by examiner

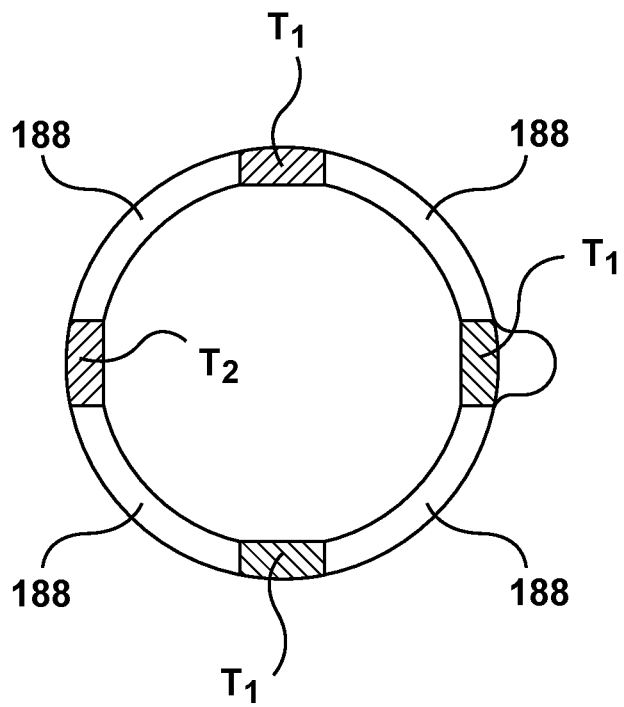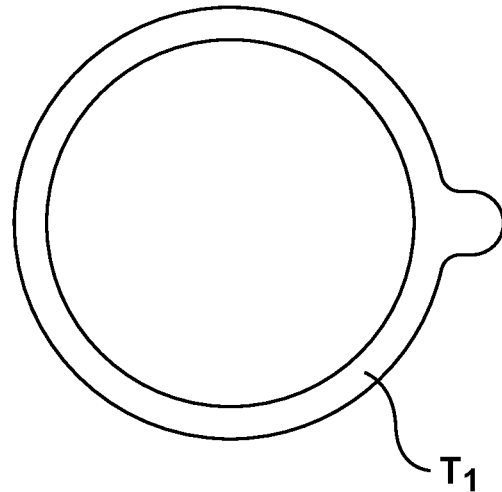
FIG. 16(a)  FIG. 16(b)
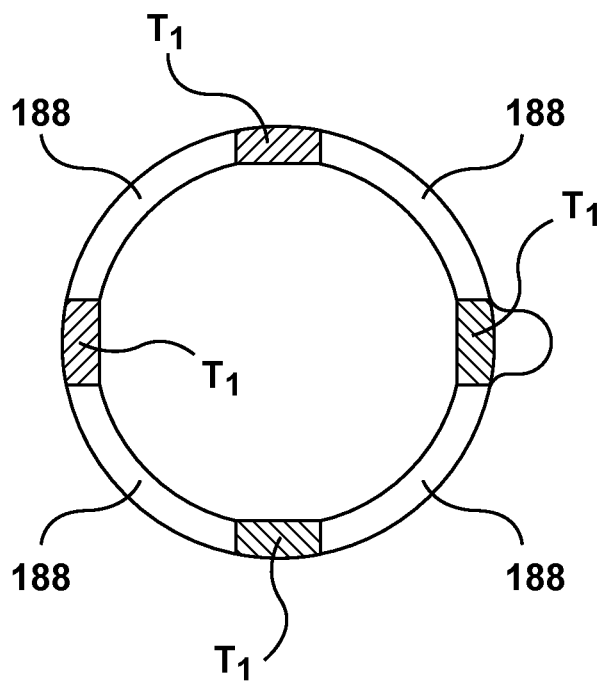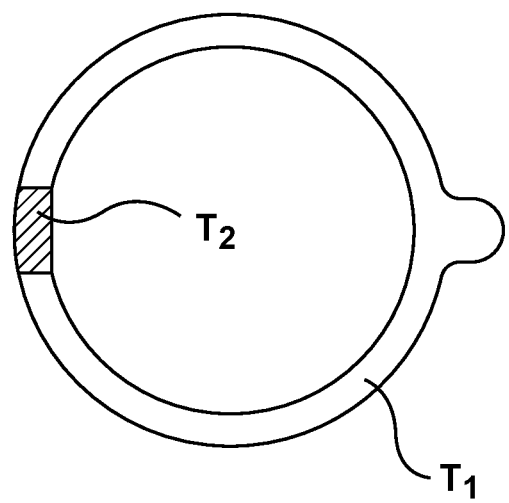
FIG. 17(a)  FIG. 17(b)

CAPSULES AND OTHER CONTAINERS WITH OPTIMIZED RECYCLING ATTRIBUTES AND METHODS FOR MAKING SAME

This is a division of application Ser. No. 17/032,206 filed on Sep. 25, 2020, which is a continuation of PCT/CA2019/050504 filed on Apr. 23, 2019, which claims the benefit of provisional application No. 62/661,464 filed on Apr. 23, 2018 and claims the benefit of provisional application No. 62/661,471 filed on Apr. 23, 2018.

FIELD

This specification relates to capsules and other containers for preparing or containing consumable products, and in particular to capsules and containers with optimized recycling attributes and systems and methods for making same.

BACKGROUND

The following background discussion is not an admission that anything discussed below is citable as prior art or common general knowledge. The documents listed below are incorporated herein in their entirety by this reference to them.

Single serve capsules adapted for use in machines to prepare a desired consumable product from pre-cursor ingredients are becoming increasingly popular. Such capsules come in a variety of formats for producing consumable products such as coffee, tea or hot chocolate.

Single serve capsules are often poorly suited for recycling following their use by the consumer. The capsules are often formed from a mix of materials that are not easily distributed to specific recycling streams. Keurig K-Cup™ capsules for example have a body that is formed from a multilayered material that includes a polyethylene or polypropylene outer layer, an EVOH barrier layer and a polyethylene sealing layer, a filter that is formed primarily out of paper and a cover that is formed from a multilayered material that includes an aluminum foil outer layer, an EVOH barrier layer and a polyethylene sealing layer.

Similar problems exist with conventional food or beverage containers containing a prepared food or beverage that does not require a machine to prepare. Such containers may be formed from a mix of materials or they may have components that are separable from the remainder of the container and too small to be collected for the proper recycling stream.

There is a need for a capsule or other container with optimized recycling attributes to overcome one or more of the problems identified above.

SUMMARY

In one aspect the invention provides a beverage capsule for use in a beverage preparing machine to prepare a beverage product, said beverage capsule comprising:
a body formed entirely of a substantially pure polymer material, said body defining an interior space having an opening;
a filter formed entirely of the same substantially pure polymer material as said body, said filter being disposed in said interior space to define an ingredients chamber for containing and filtering ingredients for preparing a desired beverage product;
ingredients disposed in said ingredients chamber for preparing a desired beverage product; and
a cover disposed on said body to close said opening.

In another aspect, the invention provides a beverage capsule for use in a beverage preparing machine to prepare a beverage product, said beverage capsule comprising:
a body defining an interior space having an opening;
a filter disposed in said interior space to define an ingredients chamber for containing and filtering ingredients for preparing a desired beverage product, said filter being formed of a hydrophobic and non-absorbent polymer material having a basis weight of less than 40 gsm;
ingredients disposed in said ingredients chamber for preparing a desired beverage product; and
a cover disposed on said body to close said opening.

In another aspect, the invention provides a capsule for containing a food product, the capsule comprising:
a body defining an interior space for containing a food product, said body having an opening for accessing the food product, said opening being surrounded by a flange; and
a cover sealed to said flange to close said opening, wherein said cover includes a hinge, that is permanently sealed at a hinge zone to said flange, and a peelable portion that is peelably sealed at a peel zone to said flange to enable said cover to be opened following use of said capsule while remaining connected at said hinge,
wherein said body and said cover are made of the same substantially pure material that is at least 95% of the same type of material by weight.

In another aspect, the invention provides a capsule for containing a food product, the capsule comprising:
a body formed entirely of a substantially pure material, said body defining an interior space for containing a food product, said body having an opening for accessing the food product, said opening being surrounded by a flange; and
a cover formed entirely of the same substantially pure material as said body, said cover being sealed to said flange to close said opening.

In another aspect, the invention provides a system for making a beverage capsule for use in a beverage preparing machine, the system comprising:
a filter station for sealing a filter to an interior space of a body for the beverage capsule to define an ingredients chamber;
an ingredients station for depositing a desired volume of desired ingredients into said ingredients chamber;
a cover sealing station for sealing a cover to said body.

In another aspect, the invention provides a process for making a beverage capsule for use in a beverage preparing machine, the process comprising the steps of:
sealing a filter to an interior surface of a body for the beverage capsule to define an ingredients chamber;
depositing a desired volume of desired ingredients into said ingredients chamber;
sealing a cover to said body to cover said opening.

Other aspects and features of the teachings disclosed herein will become apparent, to those ordinarily skilled in the art, upon review of the following description of the specific examples of the specification.

DRAWINGS

The drawings included herewith are for illustrating various examples of articles, methods, and apparatuses of the present specification and are not intended to limit the scope of what is taught in any way. For simplicity and clarity of illustration, where considered appropriate, reference numerals may be repeated among the drawings to indicate corresponding or analogous elements.

Figure 1:
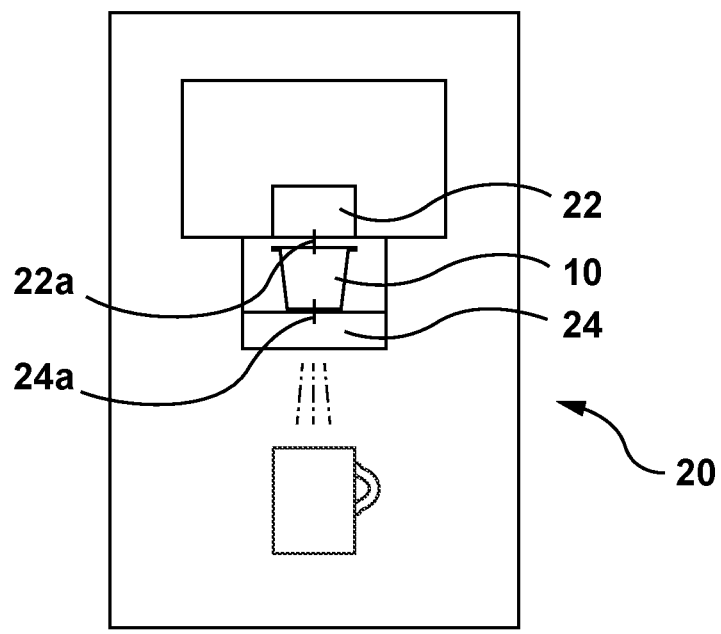
FIG. 1 is a schematic view of a capsule in accordance with one aspect of the present invention disposed in a machine for preparing a beverage.

FIGS. 16(a) and (b) are schematic views of the hinge sealing process in accordance with the present invention; and FIGS. 17(a) and (b) are schematic views of an alternate hinge sealing process in accordance with the present invention.

DESCRIPTION OF VARIOUS EMBODIMENTS

Various apparatuses or methods will be described below to provide examples of the claimed invention. The claimed invention is not limited to apparatuses or methods having all of the features of any one apparatus or method described below or to features common to multiple or all of the apparatuses described below. The claimed invention may reside in a combination or sub-combination of the apparatus elements or method steps described below. It is possible that an apparatus or method described below is not an example of the claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

A capsule in accordance with the present invention is shown generally at 10 in the Figures. Capsule 10 includes a body 12, filter 14 (when required), ingredients 16 and cover 18.

Capsule 10 is sized and configured for use in a machine 20 that is adapted for preparing a product from capsule 10.

Machine 20 includes an injection system 22 for injecting a fluid, typically heated water, into the capsule 10 for mixing with ingredients 16. Injection system 22 may include at least one injection nozzle 22a disposed on machine 20 that is adapted to pierce cover 18 to inject fluid into capsule 10.

Machine also includes a dispensing system 24 for dispensing product from capsule 10 into a desired receptacle such as a bowl or cup. Dispensing system 24 may include a hollow probe 24a that is adapted to pierce capsule 10 to dispense a prepared product from capsule 10.

In an alternative embodiment, which is commonly used with high pressure espresso machines (not shown), dispensing system 22 may be provided within the capsule 10 instead of the machine 20. Capsule 10 may for example have at least one component disposed within capsule 10 that is adapted to move under exposure to pressure to pierce a portion of capsule downstream of injection system 22 to dispense the prepared product. Alternatively, pressure within the capsule may cause a portion of the capsule to break upon contact with a portion of the machine to dispense the prepared product.

Body 12 of capsule 10 includes a sidewall 30 and an end wall 32 together defining an interior space 34. Interior space 34 preferably has a volume in the range of 30 cc to 100 cc for preparing a single serving of beverage and more preferably a volume in the range of 40 cc to 80 cc.

An opening 36 is defined at one end of body 12 and a flange 38 extends around the perimeter of opening 36 to receive cover 18 and to support capsule 10 within machine 20. Filter 14 may be secured to flange 38 or to an interior surface of capsule 10 (such as to sidewall 30 or the underside of cover 18). Filter 14 is formed to define an ingredients chamber 40 within interior space 34 for receiving and filtering at least some of ingredients 16. Filter 14 may optionally be peelably sealed to body 12 to allow filter 14 containing ingredients 16 to be removed from body 12 following use of capsule 10.

In another embodiment (not shown), body 12 may be formed with no end wall 32 and no sidewall 30 or a partial sidewall 30. Flange 38 may still extend around the perimeter of opening 36 to receive cover 18 and to support capsule 10 within machine 20. Filter 14 may be secured to flange 38 or to partial sidewall 30 or underside of cover 18 to define ingredients chamber 40.

Preferably, filter 14 is formed of a non-woven polymer fabric having a basis weight that is 40 grams or less per square meter (gsm), preferably in the range of 5 to 40 gsm, more preferably between 10 to 30 gsm and even more preferably 25 gsm or less and most preferably in the range of 10-25 gsm.

Filter 14 preferably has the material properties specified below to facilitate optimum cutting of filter 14 during the manufacture of capsule 10.

Filter 14 preferably has a tensile strength of less than 100 N/5 cm—in the Machine Direction (MD) and less than 70 N/5 cm in the Cross Direction (CD), preferably in the range of 20-70 MD and 10 to 40 CD, and more preferably in the range of 20-60 MD and 10 to 30 CD. The test method used to measure tensile strength test is described under ISO 9073.3.

Filter 14 preferably has a material tear strength of less than 15N MD and less than 20N CD, preferably in the range of 1-12 MD and 1-15 CD, and more preferably in the range of 3-10 MD and x3-10 CD. The test method used to determine material tear strength is described under ISO 13937.2.

Filter 14 preferably has an elongation to break value of less than 50% MD and less than 40% CD, and more preferably less than 40% MD and less than 30% CD. The test method used to determine elongation to break value is described under ISO 9073.3.

Ingredients 16 may include insoluble ingredients 16, such as tea leaves, coffee grounds, herbs, spices or other ingredients, that are disposed in ingredients chamber 40 and adapted for forming a consumable product by extraction or infusion using machine 20. Additional ingredients 16 may be disposed in ingredients chamber 40 or elsewhere in interior space 34. Such additional ingredients 16 may include soluble ingredients 16 such as coffee, chocolate, soup stock, flavor additives or other ingredients in powdered, crystallized or other forms adapted for solubility or contained within a soluble film or pouch. Additional ingredients 16 may also include active ingredients (e.g. foaming agents), natural health additives, regulated drugs, alcohol or other soluble or insoluble ingredients.

Cover 18 is disposed over opening 36 and secured to body 12 such as by sealing cover 18 directly to flange 38 or by sealing cover 18 to filter 14 which in turn is sealed to flange 38. Cover 18 may be formed of a polymer material that is resistant to tearing and adapted to shrink upon exposure to heat. Cover 18 may thus be adapted to shrink around the opening formed in cover 18 by injection system 22 to form a sufficient seal to withstand the buildup in pressure within capsule 10 under normal conditions during use in machine 20. In other words, cover 18 may be adapted to shrink sufficiently around the at least one injection nozzle when the at least one injection nozzle pierces the cover and injects heated fluid into the capsule to create a seal and allow the buildup in pressure within capsule up to a maximum pressure. Alternatively, cover 18 may be formed of a metallic foil material such as aluminum foil.

In a preferred embodiment, components of capsule 10 (not including ingredients 16) are formed from a single, substantially pure, type of material. This is also referred to herein as a mono-material capsule made with mono-material components. The type of material is selected based on factors including recyclability, ease of manufacturing, durability and desired shelf life. Thus body 12, filter 14 (if provided) and cover 18 each may be separate components that each are formed from the same, substantially pure, type of material. Alternatively, body 12 and filter 14 (if provided) each may be formed from the same, substantially pure, type of material and cover 18 may be formed of a different material.

The term "substantially pure" is defined herein to mean at least 90% of the same type of material by weight (90%/wt), preferably at least 95%/wt, even more preferably at least 97%/wt and most preferably 100%/wt. The remaining different type of materials may include residual materials such as adhesives, barrier materials and print coatings. As noted above, the desired purity is determined in part by choice of material and shelf life considerations (for example, certain ingredients 16 may require little or no barrier protection or may have a shorter shelf life).

One preferable type of material for forming the components of the capsule 10 is polypropylene (PP) (which may include variants such as cast polypropylene (CPP)). Another preferable type of material is polyethylene terephthalate (PET) (which may include variants such as cast polyethylene terephthalate (CPET)). The PP and PET (and their variants) may be 100% fossil fuel based or it may be a mix of fossil fuels, post-recycled material and/or or bio-resins. Another preferable type of material is aluminum. Yet another preferred type of material is polylactic acid (PLA) for its biodegradable properties. The invention is not intended however to be restricted to any specific type of material provided that it is a single, substantially pure, type and that it meets the needs for operation of the capsule 10 in the machine 20.

Figure 4:
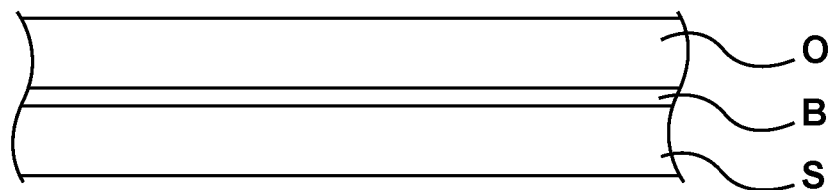
FIG. 4 is a schematic cross-sectional view of a material for forming the body and/or cover of the capsule of FIG. 1.

Referring to FIG. 4, a schematic view of a cross-section of material that may be used for body 12 and/or cover 18 is shown. Material is preferably a multi-layered material that includes an outer layer O, a barrier layer B and a sealing layer S. Outer layer may for example be formed of PP, barrier layer B may be formed of a glass coating of aluminum oxide or silicon oxide and sealing layer may be formed of CPP (which is considered herein to be the same type of material as PP). Barrier layer B is formed of a different type of material however the overall material is still within the defined ranges of being substantially pure.

Figure 5:
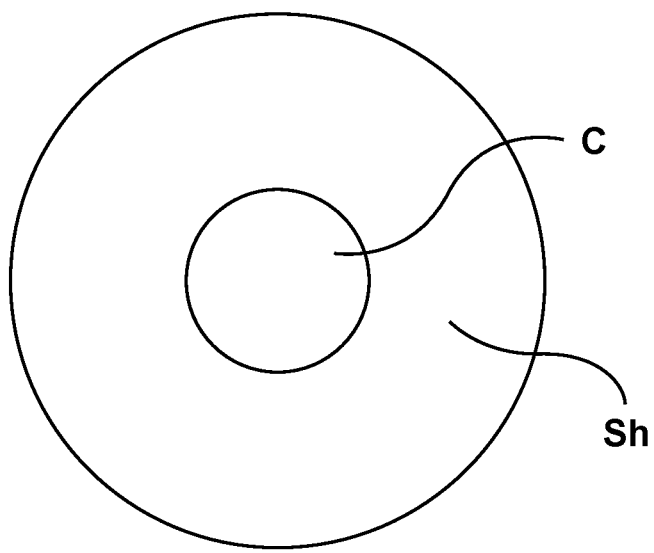
FIG. 5 is a schematic cross-sectional view of a fiber for forming the filter of the capsule of FIG. 1.

Referring to FIG. 5, a schematic view of a cross section of a fiber for forming filter 14 is shown. Fiber is preferably a multi-component material that includes a sheath material Sh surrounding a core material C. Sheath Sh may for example be formed of CPP and core may for example be formed of PP. In a preferred embodiment a single core is provided. Core material C preferably has a higher melt point than sheath material Sh.

In some embodiments, cover 18 may be formed of a different type of material from body 12 and filter 14 provided that cover 18 may be easily separated from the remainder of the capsule 10 following use or is otherwise compatible from a recycling standpoint. For example, body 12 and filter 14 may be formed of PP and cover 18 may be formed of aluminum foil. Following use, the consumer may separate the cover 18 from the remainder of the capsule 10 so that the cover 18 may be placed into one stream of recycling and the remainder of the capsule 10 may be placed into another stream of recycling (with the consumer optionally also placing used ingredients 16 from capsule 10 into another stream for composting).

Preferably however, cover 18 is formed from the same type of material as the body 12 and filter 14 of capsule 10. In such instances, it is desirable that cover 18 remain at least partially attached to the remainder of capsule 10 in order that capsule 10 with cover 18 attached may be disposed into the same recycling stream. This avoids placing small components (such as cover 18) separately into the recycling stream where they may not be large enough to be mechanically collected for recycling. Preferably, a hinge 50 is formed on one or both of cover 18 and body 12 to allow cover 18 to be lifted or peeled partially away from the remainder of capsule 10 to allow ingredients 16 to be discarded (preferably to compost) while ensuring that cover 18 remains tethered to the remainder of capsule 10. A tab 52 may also be provided to assist the user with lifting or peeling away cover 18.

Figure 2:
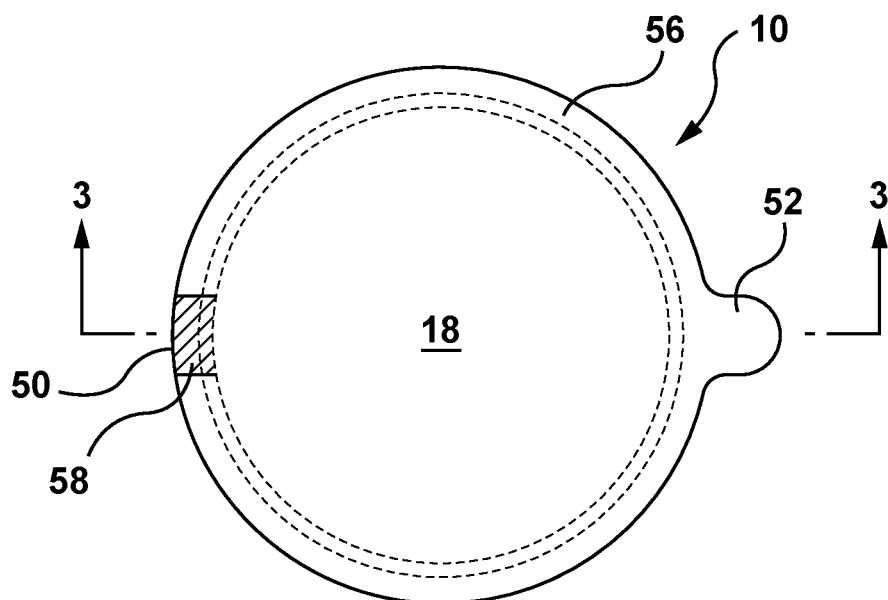
FIG. 2 is a top view of the capsule of FIG. 1.
Figure 3:
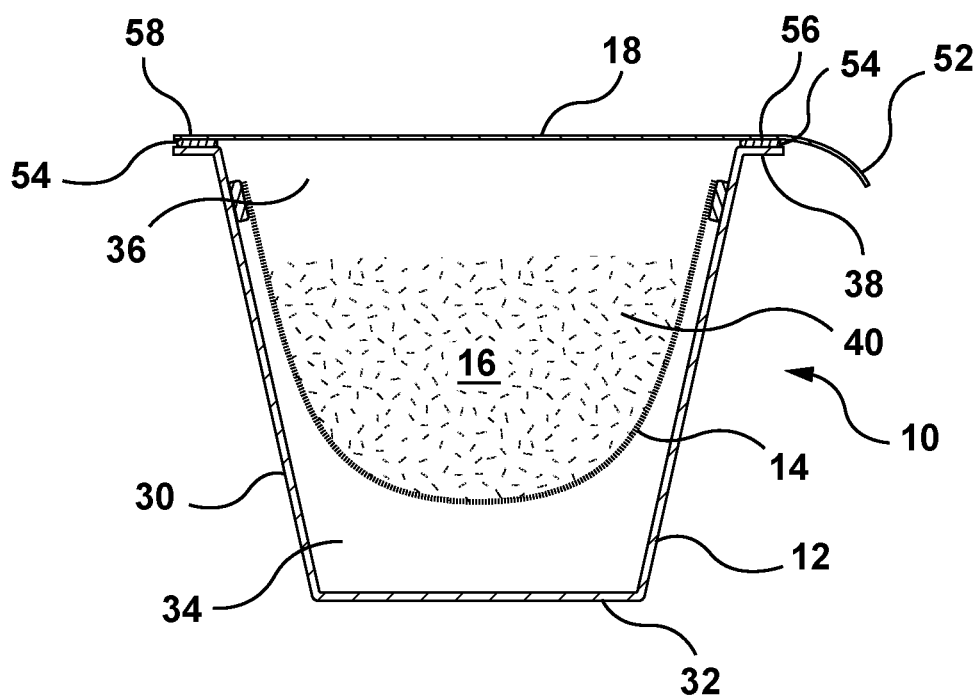
FIG. 3 is a sectional view of the capsule of FIG. 1 as viewed along lines 3-3.

Referring to FIGS. 2 and 3, a preferred structure for hinge 50 is shown. Capsule 10 includes a seal 54 between the underside of cover 18 and the top of flange 38 around the circumference of body 12. Seal 54 includes a peel zone 56 and a hinge zone 58. Seal 54 for peel zone 56 is a peelable seal between cover 18 and flange 38 that allows a consumer to peel cover 18 away from flange 38 by hand without excessive effort. Seal 54 for hinge zone 58 has a more secure seal between cover 18 and flange 38 that does not allow a consumer to peel cover 18 away from flange 38 by hand without excessive effort. In other words, hinge zone 58 has a higher seal or bond strength than peel zone 56. Preferably, hinge zone 58 has a seal or bond strength that is at least 1.5 times as strong as the strength of peel zone 56 and even more preferably at least 2 times as strong. Seal or bond strength may be measured following the principals of ASTM F904.

Figure 6:
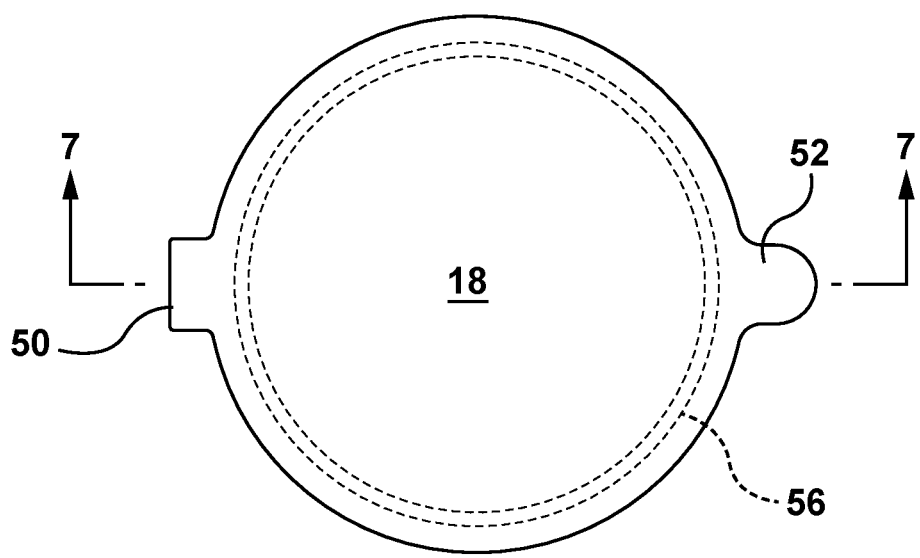
FIG. 6 is a top view of another embodiment of the capsule of FIG. 1 showing a different hinge structure.
Figure 7:
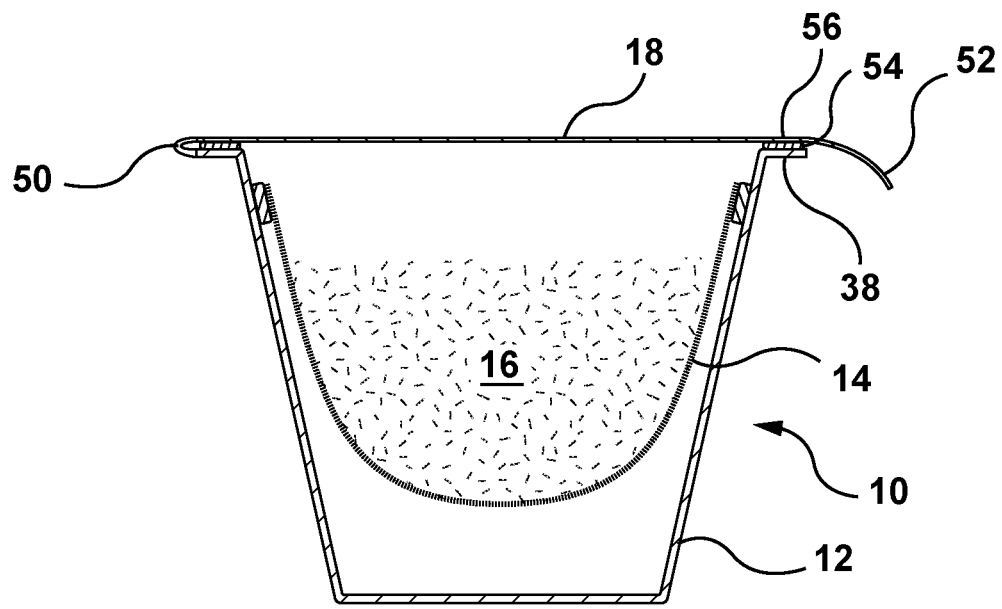
FIG. 7 is a sectional view of the capsule of FIG. 6 as viewed along lines 7-7.

Referring to FIGS. 6 and 7, another structure for forming hinge 50 is shown. Similar reference numerals are used to refer to similar elements for the embodiments described herein. Capsule 10 includes an integral connection between body 12 and cover 18. Hinge 50 is integrally formed from both body 12 and cover 18 to allow cover 18 to be opened following use. Cover 18 may be sealed to flange 38 with seal 54 in the form of a peelable seal around the entire circumference of body 12 or cover 18 may be adapted to snap fit to body 12 (not shown).

Figure 8:
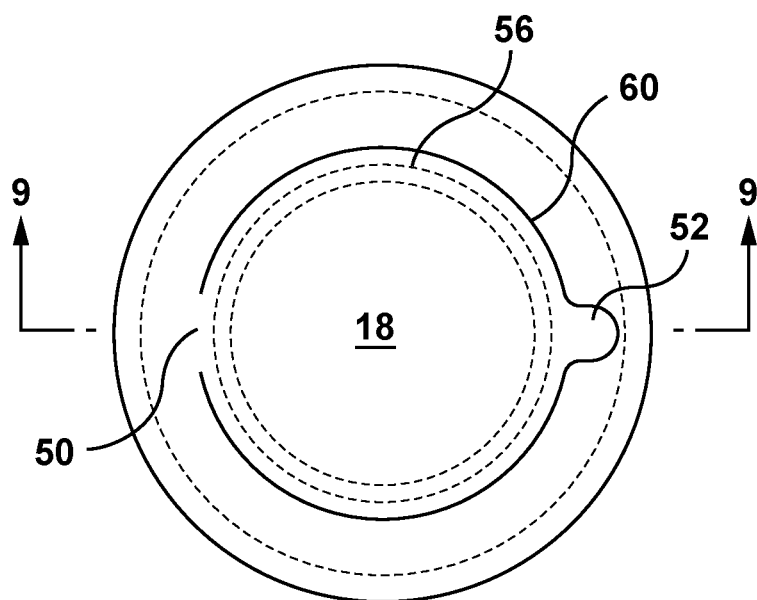
FIG. 8 is a top view of another embodiment of the capsule of FIG. 1 showing a different hinge structure.
Figure 9:
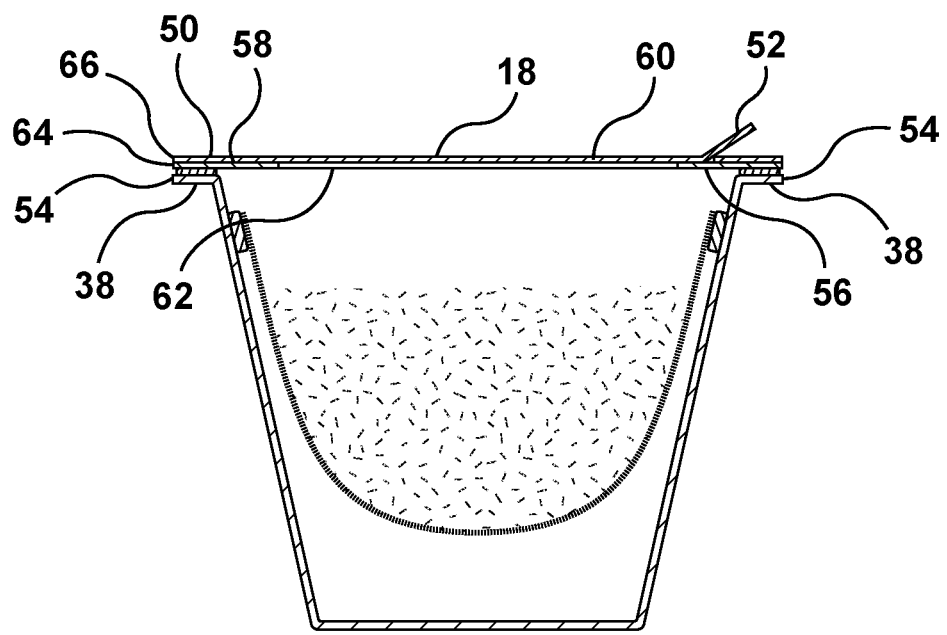
FIG. 9 is a sectional view of the capsule of FIG. 8 as viewed along lines 9-9.
Figure 10:
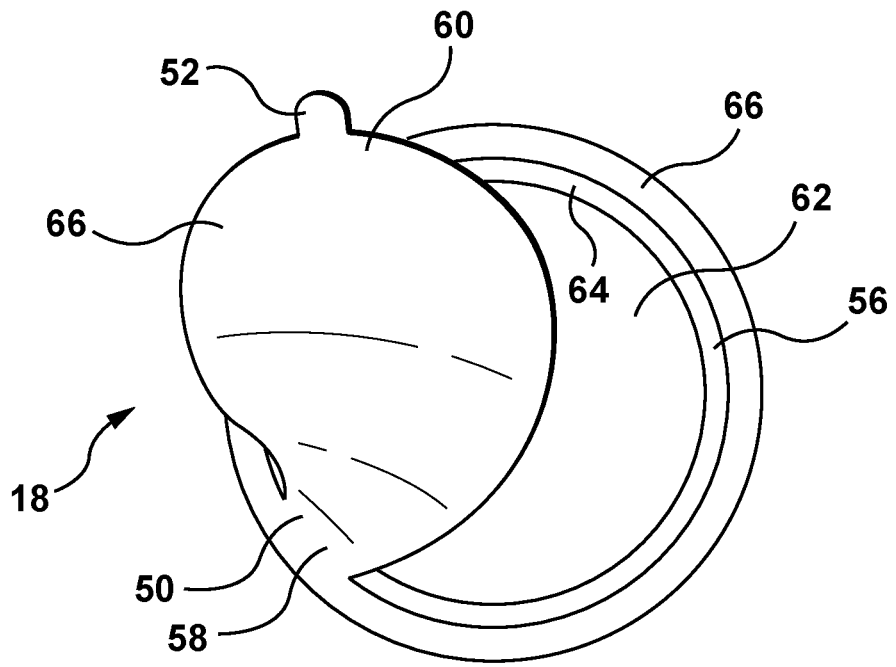
FIG. 10 is a perspective view of the capsule of FIG. 8 showing the flap open.

Referring to FIGS. 8-10, another structure for forming hinge 50 is shown. Similar reference numerals are used to refer to similar elements for the embodiments described herein. Capsule 10 includes a more secure seal 54 between the underside of cover 18 and the top of flange 38 around the circumference of body 12. Cover 18 includes a flap 60 that may be lifted or peeled away from the remainder of cover 18 to permit access to the contents of capsule 10. Cover 18 may be formed of a multi-layered material with an aperture 62 defined in a base layer 64 and flap 60 defined in a top layer 66 to cover aperture 62. Base layer 64 includes a peel zone 56 extending around a substantial portion of the periphery of aperture 62. Seal 54 for peel zone 56 is a peelable seal between flap 60 and base layer 64. Tab 52 may also be provided on flap 60 to assist the user with lifting or peeling away flap 60. Hinge 50 is preferably disposed on hinge zone 58 of flap 60.

Figure 11:
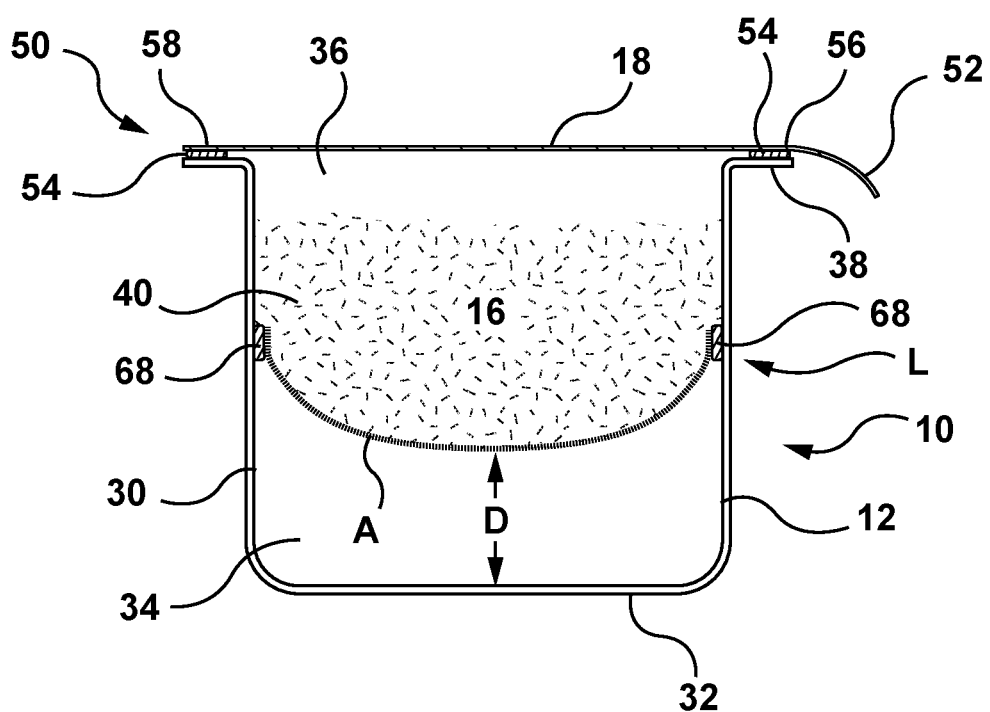
FIG. 11 is a sectional view of the capsule in accordance with another embodiment of the present invention.

Referring to FIG. 11, another embodiment for capsule 10 is shown. Similar reference numerals are used to refer to similar elements for the embodiments described herein.

Capsule 10 includes filter 14 that is secured with a seal 68 to an interior surface of body 12 fully around the circumference of sidewall 30 at a location L between opening 36 and end wall 32. Preferably, filter 14 is spaced away from opening 36 (i.e. not proximate to opening 36). More preferably, filter 14 is secured to body 12 at a location that is in the middle ⅓ of the distance between opening 36 and end wall 32. Filter 14, at its lowest point, is preferably spaced a distance D from end wall 32. Distance D is selected to avoid filter 14 being contacted by hollow probe 24a of dispensing system 24 during use of capsule 10 in machine 20 (as shown in FIG. 1).

Filter 14 forms a cup shaped area for containing and filtering ingredients 16. Filter 14 includes a sufficient surface area A for allowing fluid to flow through filter 14 at a desired rate during the preparation of the beverage product. Preferably, for a capsule having a volume of 40-80 cc, filter 14 has a surface area of 10-70 cm2. More preferably, filter 14 has a surface area of 15-50 cm2. Filter 14 and body 12 are formed from the same substantially pure material and thus, filter 14 may be secured with seal 68 to body 12 using a heat seal that causes the materials to melt and securely bond together to form seal 68 that does not allow ingredients 16 to bypass filter around seal 68.

Figure 12:
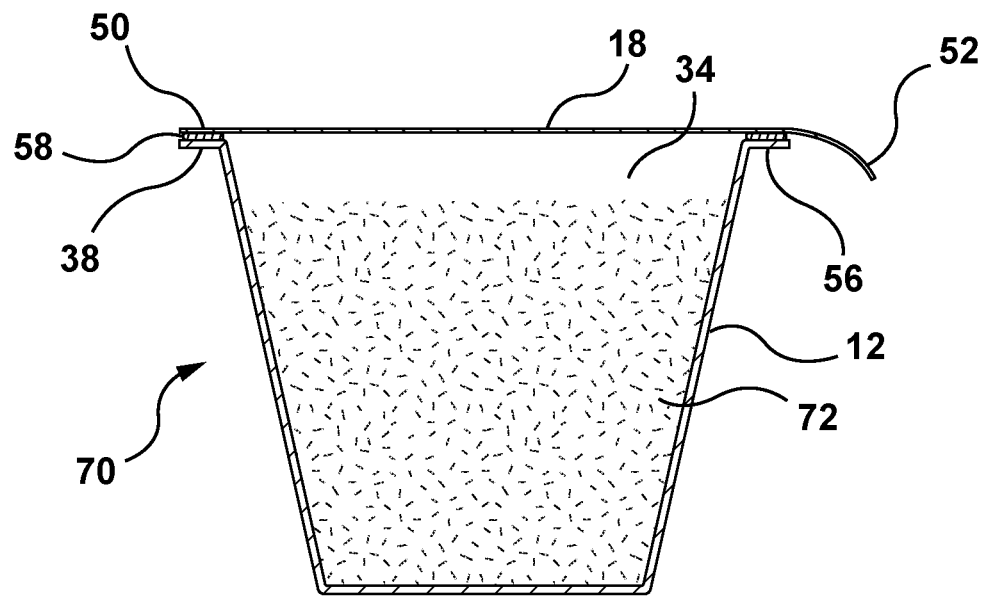
FIG. 12 is a schematic sectional view of a container in accordance with one aspect of the present invention.
Figure 13:
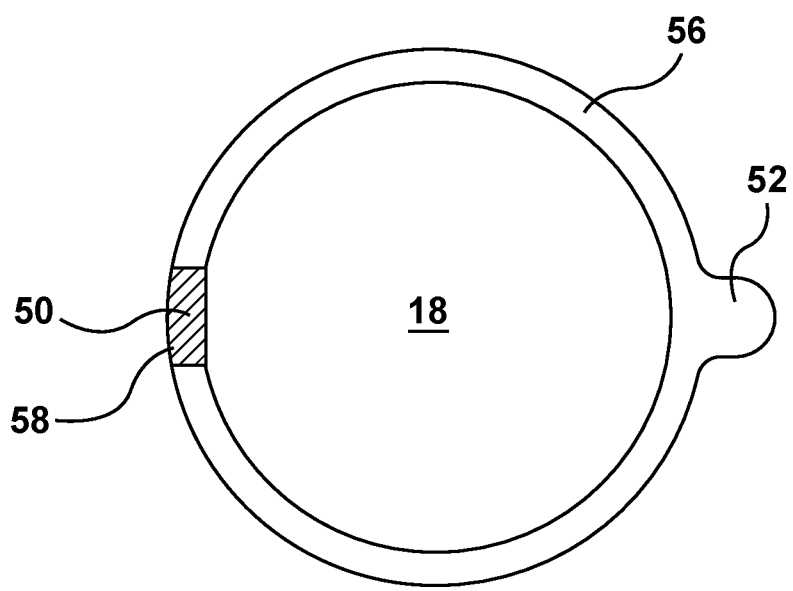
FIG. 13 is a top view of the capsule of FIG. 12.

Referring to FIGS. 12-13, a container 70 for containing a prepared consumable product 72 is shown. Prepared consumable product 72 is a prepared food or beverage product that is ready to be consumed by the end user without any further preparation steps and thus does not require an intermediate process of preparing the consumable product in a machine such as described for capsule 10 above. Container 70 is, in certain other respects, similar to the embodiments of capsule 10 described herein and similar reference numerals are used to refer to similar elements for the embodiments described herein.

Container 70 includes body 12 and cover 18 that are each formed from a single, substantially pure, type of material. Body 12 defines an interior space 34 for containing prepared consumable product 70 and a flange 38 surrounding an opening 36 for receiving cover 18 to cover opening 36. Cover 18 is connected to flange 38 with a seal 54 that includes a peel zone 56 and a hinge zone 58. Cover 18 may further include a tab 52 to assist a user with peeling cover 18 away from body 12 to access the prepared consumable product 70 through opening 36. Hinge 50 is provided to allow cover to be partially removed from body 12 while still ensuring that cover 18 remains tethered to body 12 after use.

Figure 14:
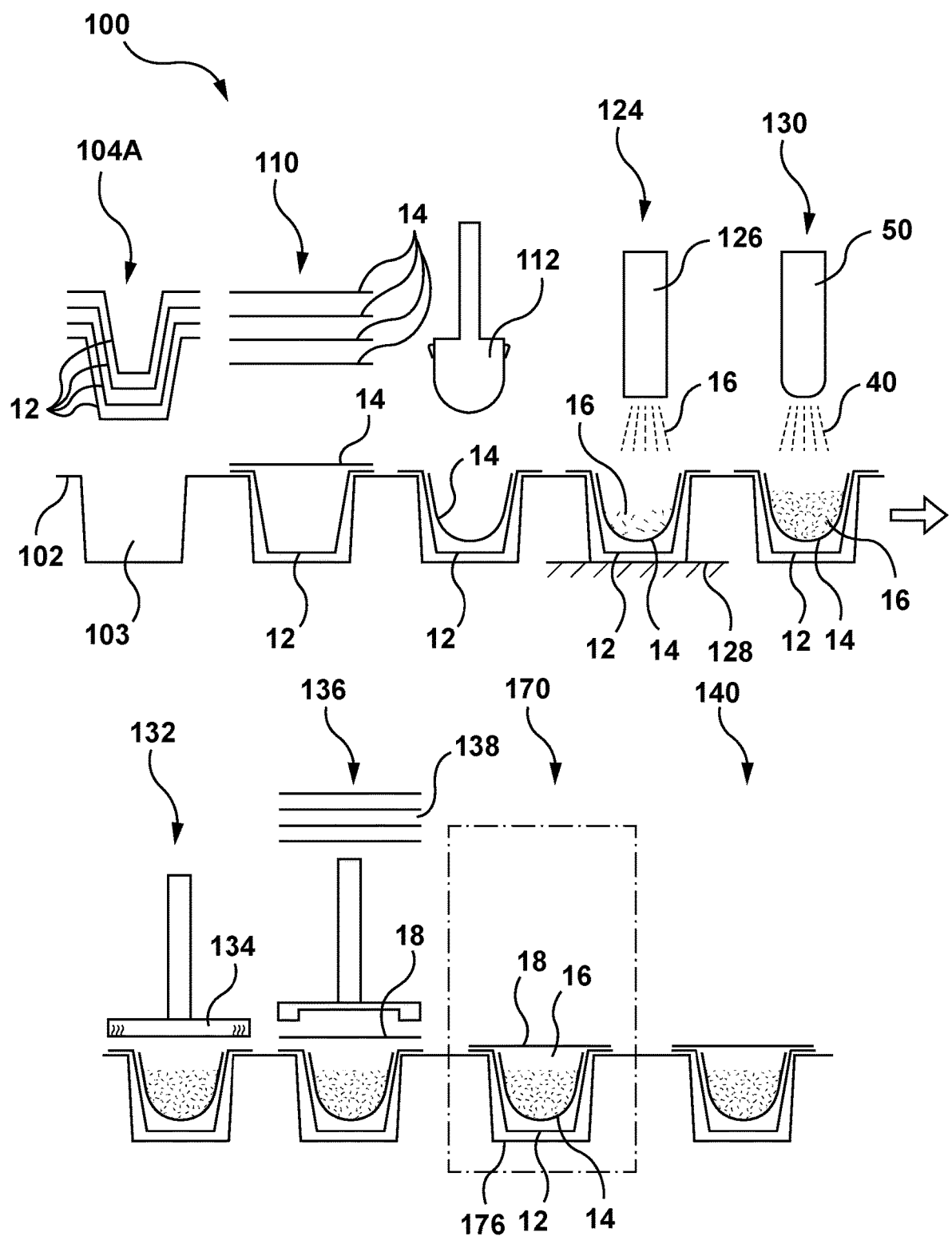
FIG. 14 is a schematic view of a manufacturing system for manufacturing a capsule in accordance with the present invention.
Figure 15:
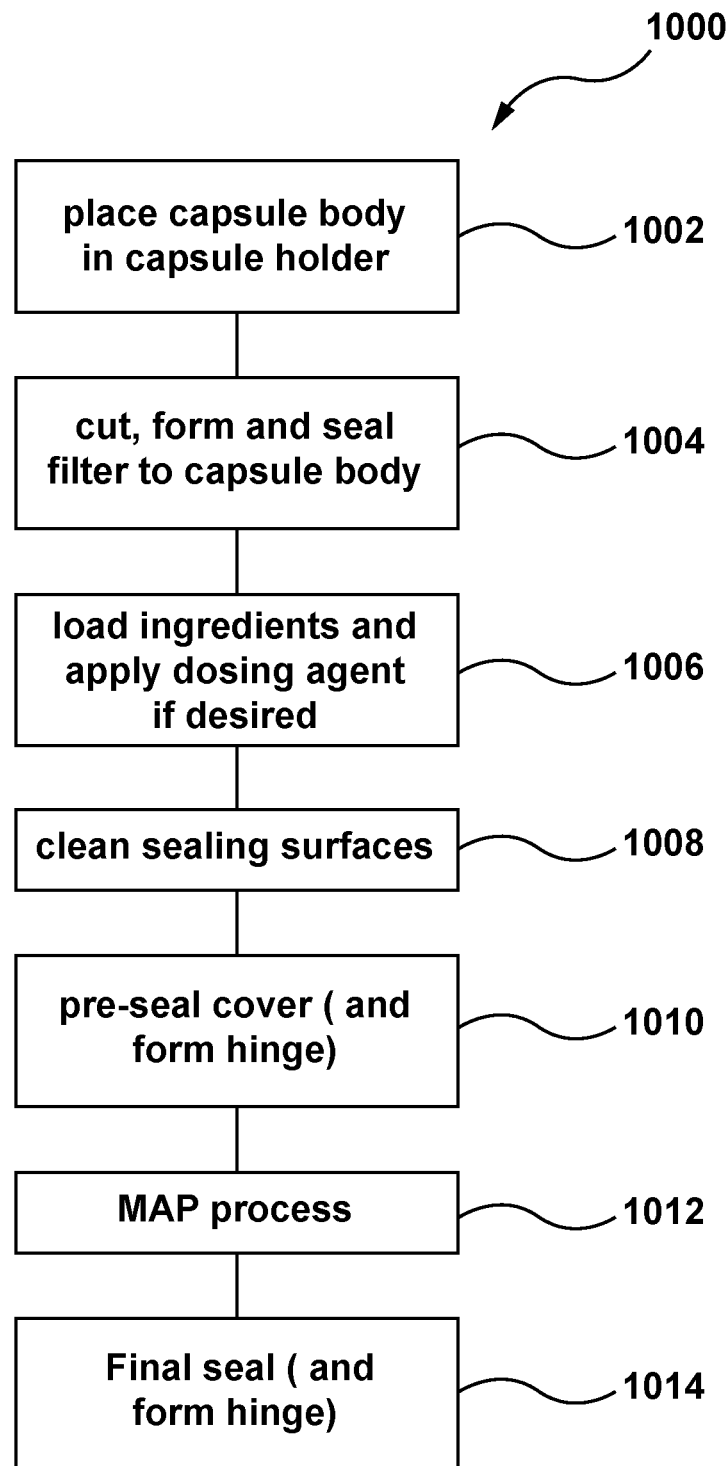
FIG. 15 is a flow chart depicting a method for manufacturing a capsule in accordance with the present invention.

Referring to FIGS. 14-15, schematic views of a system 100 and a process 1000 for making capsules 10 is shown.

System 100 comprises at least one transfer belt 102 having a plurality of capsule holders 103 adapted to cyclically and sequentially transfer capsules 10 from a working station to a following station as described further below. While only a single capsule holder 103 is shown at each station for system 100 it will be understood that transfer belt 102 has multiple capsule holders 103 disposed at each station in order that manufacturing operations may be performed simultaneously on multiple capsules at each station.

System 100 includes a body forming station 104 for engaging a sheet of moldable multilayered body material 106 with a heated mandrel 108 to form body 12 in accordance with body forming step 1002. Alternatively, body forming station may be replaced with a body supply station 104A having a body supplier, such as a denester, that denests previously formed bodies 12 from a body supply, and places each body 12 into a respective capsule holder 103.

Capsule holder 103 with body 12 is then transferred to a filter station 110 for forming and sealing filter 14 to body 12 (in those instances where a filter 14 is required). Filter station 110 may include a supply of pre-cut filters 14 that are sized to be formed and sealed to body 12. A pre-cut filter 14 may be picked from pre-cut filter supply and deposited over opening 36 of body 12. A forming and sealing tool 112 may then engage pre-cut filter to form filter 14 and seal to body 12 (or seal to body 12 and subsequently form filter 14). Alternatively, filter station 110 may include a roll of filter material that is subsequently cut to a desired size either before or after the filter is formed within body 12 and/or sealed to body 12. It should be noted that filter 14 is preferably loosely formed within body 12 to define ingredients chamber 40. Preferably filter 14 is not stretched in the process of forming filter 14. Preferably, filter material is cut into a circular disc having a diameter that is larger than the diameter of opening 36. Filter 14 will then be loosely formed within body 12 with portions of filter 14 overlapping each other or bunching together within body 12.

Capsule holder 103 with body 12 and filter 14 (where filter is required) is then transferred to an ingredients station 124 having an ingredients supplier 126 for supplying a desired amount of ingredients 16 into ingredients chamber 46 in accordance with ingredients loading step 1010. A scale 128 weighs beverage capsule 10 to ensure that the desired amount of ingredients 16 have been disposed into ingredients chamber 46.

If a dosing agent is required, then capsule holder 103 transfers body 12 with filter 14 and ingredients 16 to dosing agent station 130 having a dispenser 50 for dispensing a desired amount of dosing agent 40 into ingredients 16 in accordance with dosing step 1012.

Following dosing step 1012, capsule holder 103 then transfers body 12 with filter 14 and ingredients 16 with dosing agent 40 to cleaning station 132 where a vacuum conduit 134 cleans the exposed surface of flange 28 or gasket portion 50 of filter 14 in preparation for sealing with cover 18 in accordance with cleaning step 1014.

The system and process described above may either be performed in a non-modified atmospheric environment (such as a regular open-air manufacturing environment) or it may be performed in a modified atmospheric environment (such as an environment where air has been evacuated and replaced with an inert gas such as nitrogen). In a non-modified atmospheric environment, capsules 10 may need to be transferred to a modified atmospheric environment for the remaining steps of replacing the air within capsule with an inert gas and sealing cover 18 to body 12. In a modified atmospheric environment, capsules 10 already contain an inert gas and simply require cover 18 to be sealed to body 12.

Various options for forming hinge 50 on cover 18 are described below for both non-modified and modified atmospheric embodiments.

In a non-modified atmospheric environment, capsule holder 103 transfers body 12 with filter 14 and ingredients 16 with dosing agent 40 to a cover pre-sealing station 136 for receiving a supply of a cover material 138 and pre-sealing a portion of cover 18 to flange 38 of body 12 in accordance with pre-sealing step 1016. Pre-sealing may be accomplished for example by thermal welding (heat sealing) or ultrasonic welding. Cover pre-sealing station 136 leaves openings 188 along edge of cover 18 for allowing air to be evacuated and inert gas to be flushed into capsule during the modified atmosphere packaging (MAP) process step 1018 as described in more detail below. Cover material 138 may be supplied in the form of pre-cut covers 12 that are picked and placed on body 12 for pre-sealing. Alternatively, a roll of cover material 138 may be provided and each cover 18 may be cut to a desired size prior to or following the step of pre-sealing cover 18 to body 12.

Referring to FIGS. 16(*a*) and (*b*), one approach to pre-sealing cover 18 to body 12 is shown. In FIG. 16(*a*), cover 18 is pre-sealed at a first temperature T1 in specific locations around flange 38 to form a peelable seal. Cover 18 is also sealed at hinge zone 58 to define hinge 50. Hinge 50 is formed at a second temperature T2 and/or using a different sealing technique (such as an ultrasonic weld instead of a thermal weld) to form a stronger seal than the seal in peel zone 56. In FIG. 16(*b*), cover 18 is subsequently sealed, following the MAP process described below, entirely around flange 38 to define a peelable seal in peel zone 56 and to fully seal capsule 10.

Referring to FIGS. 17(*a*) and (*b*), another approach to pre-sealing cover 18 to body 12 is shown. In FIG. 17(*a*), cover 18 is pre-sealed at a first temperature T1 in specific locations around flange 38 to form a peelable seal. In FIG. 16(*b*), cover 18 is subsequently sealed, following the MAP process described below, around peel zone 56 at temperature T1. Hinge 50 is formed in hinge zone 58 at a second temperature T2 and/or using a different sealing technique (such as an ultrasonic weld instead of a thermal weld) to form a stronger seal than the seal in peel zone 56.

Hinge 50 may be formed in a two-stage process where the seal in hinge zone 58 is formed at one stage and the seal in peel zone is formed at another stage. Alternatively, hinge 50 may be formed in a single-stage process where a hinge applicator tool (not shown) having two different sealing heads is provided. One sealing head is adapted for forming a peelable seal in peel zone 56 of capsule 10 and the other sealing head is adapted for forming a relatively non-peelable seal in hinge zone 58 of capsule. The sealing heads of the hinge applicator tool may be adapted to operate at different sealing temperatures T1 and T2 and/or it may be adapted to perform different sealing operations (such as a thermal weld and an ultrasonic weld).

Partially sealed capsules 10 are then transferred from capsule holders 103 in transfer plate 102 to corresponding capsule holders 176 disposed within a transfer plate 178 using a pick-and-place device (not shown) or other suitable mechanism. Capsule holders 176 and transfer plate 178 are specially adapted for use during the MAP process step 1018.

Transfer plate 178 with partially sealed beverage capsules 10 disposed in capsule holders 176 is then moved to a MAP station 170 for execution of the MAP process step 1018 as described in more detail in US patent publication 20140141128 which is incorporated herein in its entirety by reference. Once the MAP process is complete, openings 188 in cover 18 are sealed with sealer 192 in accordance with sealing step 1020 and the finished capsule 10 is transferred using a pick-and-place device (not shown) or other suitable mechanism to a collection station 140 for subsequent packaging into boxes (not shown).

In a modified atmospheric environment, capsule holder 103 transfers body 12 with filter 14 and ingredients 16 with dosing agent 40 to a final cover sealing station 136 for receiving a supply of a cover material 138 and sealing cover 18 to flange 28 of body 12 in accordance with sealing step. Sealing may be accomplished by thermal welding (heat sealing) or ultrasonic welding. Cover material 138 may be supplied in the form of pre-cut covers 12 that are picked and placed on body 12 for pre-sealing. Alternatively, a roll of cover material 138 may be provided and each cover 18 may be cut to a desired size prior to or following the step of pre-sealing cover 18 to body 12.

In the modified atmospheric environment, hinge 50 may be formed prior to the final sealing step, after the final sealing step or during the final sealing step. Hinge 50 may be formed is a similar manner as discussed above with reference to FIGS. 16 and 17. Thus, cover 18 may be sealed to hinge zone of flange 38 at temperature T2 and/or by using a different sealing technique (such as an ultrasonic weld instead of a thermal weld) to define hinge 50 and the remainder of cover may be sealed to peel zone of flange 38 at temperature T1 and/or by using a different sealing technique (such as an thermal weld instead of an ultrasonic weld). Alternatively, cover 18 may first be sealed around flange 38 at temperature T1 to define peel zone 56 and then cover 18 may be sealed at hinge zone 58 to define hinge 50.

It will be understood that system 100 and process 1000 do not require all stations and steps to be provided. It will also be understood that the relative position of stations or the order of process steps may be changed depending on the desired structure and contents of the finished capsule 10.

While the above description provides examples of one or more processes or apparatuses, it will be appreciated that other processes or apparatuses may be within the scope of the accompanying claims.

What is claimed is:

1. A process for making a beverage capsule for use in a beverage preparing machine, the process comprising the steps of:

sealing a filter to an interior surface of a body for the beverage capsule to define an ingredients chamber;

depositing a desired volume of desired ingredients into said ingredients chamber;

sealing a cover to said body to cover said opening, said cover is sealed to said body to define a hinge zone and a peel zone, wherein said hinge zone has a stronger seal than said peel zone.

2. The process of claim 1 wherein said filter has a basis weight of less than 40 gsm.

3. The process of claim 1 wherein said filter is pre-cut to a desired diameter that is larger than the diameter of said interior space.

4. The process of claim 1 further comprising the steps of (i) sealing a portion of said cover to said body and (ii) replacing air in said capsule with an inert gas and (iii) sealing the remainder of said cover to said body.

5. The process of claim 1 wherein said peel zone is formed by sealing a portion of said cover to said body at a first temperature T1 and said hinge zone is formed by sealing the remaining portion of said cover to said body at a second temperature T2, where T2 is a higher temperature than T1.

6. The process of claim 1 wherein said peel zone is formed by sealing a portion of said cover to said body using a first sealing technique that forms a peelable seal and said hinge zone is formed by sealing the remaining portion of said cover to said body using a second sealing technique that is different from the first sealing technique and forms a stronger seal than the peelable seal.

7. The process of claim 1 wherein said cover sealing step includes a two-stage process with one stage for forming said hinge zone and another stage for forming said peel zone.

8. The process of claim 1 wherein said cover sealing step includes a single-stage process with two different sealing heads where one of said sealing heads is adapted for forming said hinge zone and the other of said sealing heads is adapted for forming said peel zone.

9. The process of claim 8 wherein said sealing head that is adapted for forming said peel zone operates at a first temperature T1 and said sealing head that is adapted for forming said hinge zone operates at a second temperature T2, where T2 is a higher temperature than T1.

10. The process of claim 8 wherein said sealing head that is adapted for forming said peel zone uses a first sealing technique and said sealing head that is adapted for forming said hinge zone uses a second sealing technique that is different from the first sealing technique in order to form a stronger seal.

11. The process of claim 1 wherein said body and said filter are each formed entirely of a substantially pure polymer material.

12. The process of claim 11 wherein said cover is formed entirely of the same substantially pure polymer material as said body and said filter.

13. The process of claim 11 wherein said substantially pure polymer material is selected from one of PP, PET or PLA.

14. The process as claimed in claim 11 wherein said substantially pure polymer material is at least 90% pure by weight.

15. The process as claimed in claim 11 wherein said substantially pure polymer material for said body includes a barrier material that provides an oxygen barrier between an exterior of said capsule and said interior space.

16. The process of claim 1 wherein said filter is formed of bi-component fibers.

17. The process of claim 1 wherein the filter is sealed to said body within said interior space.

18. The process of claim 1 wherein said body includes a sidewall and an end wall that define said interior space.

19. The process of claim 18 wherein said filter is sealed to said sidewall within said interior space at a location that is in the middle one-third of the distance between said opening and said end wall.

20. The process of claim 18 wherein said filter, at its lowest point, is spaced a minimum distance D from said end wall to avoid said filter being contacted by a dispensing system during use of capsule in the machine.

\* \* \* \* \*